Feb. 22, 1949. F. AKIN 2,462,453
BATTERY TERMINAL
Filed Nov. 19, 1945
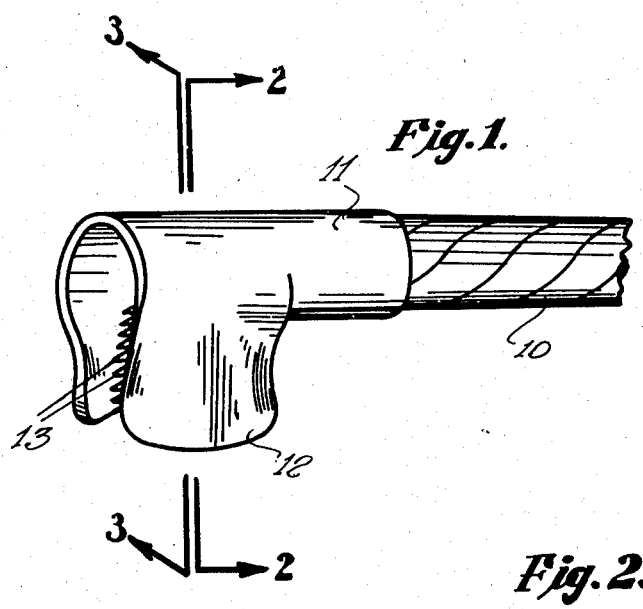
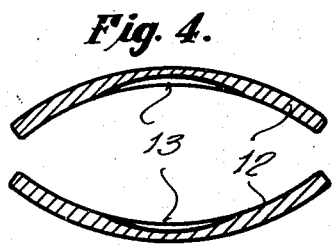
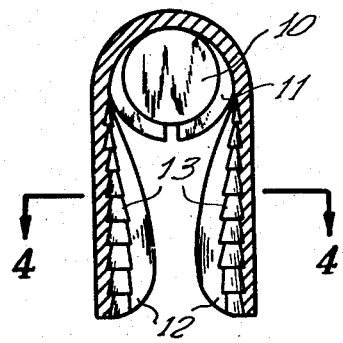
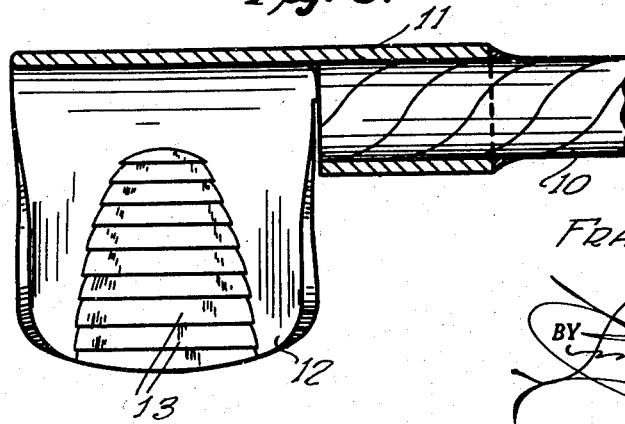
FRANK AKIN
INVENTOR.
BY
ATTORNEY Patented Feb. 22, 1949

2,462,453

UNITED STATES PATENT OFFICE 2,462,453

BATTERY TERMINAL

Frank Akin, Dallas, Tex.

Application November 19, 1945, Serial No. 629,449

1 Claim. (Cl. 173—259)

This invention relates to storage battery cable terminals and more particularly to terminals for cables employed in automobiles.

The principal object of the invention is to minimize or eliminate the disadvantages common in conventional clamp type cable terminals, arising because of corrosive action occurring between the clamp and battery post, making it difficult to remove the clamp without damage to the post or battery. The present invention consists of a clip or clamp devoid of threaded bolts, and relies on its own inherent resiliency to retain its position on a battery post but which is releasable therefrom only by applying a tool in such manner as to overcome the tension of the clip body, releasing it from the post.

Another object of the invention is to provide a simple and inexpensive cable terminal constructed of spring metal, so constructed that it may be applied to a battery post by the simple expedient of imposing thereon a downward thrust to expand its jaws to receive and grip the post, requiring no tools for the purpose.

With the foregoing objects as paramount the invention has further reference to certain features of accomplishment which will become apparent as the description proceeds taken in connection with the accompanying drawing wherein:

Figure 1 is a perspective view of a cable terminal clamp constructed according to the invention.

Figure 2 is a view in vertical section, taken on line 2—2 on Fig. 1.

Figure 3 is a view in longitudinal section taken on line 3—3 on Figure 1, and

Figure 4 is a view in transverse section, taken on line 4—4 on Figure 2.

Continuing with a more detailed description of the drawing, reference numeral 10 denotes a battery cable on which the clamp of the invention is mounted as by soldering or other means.

The clamp is formed from a die stamped blank of spring metal to define a ferrule or sleeve 11 receiving the cable 10 and parallel jaws 12 of concavo-convex cross-section whose concave surfaces are in confronting relationship to embrace opposite sides of a battery terminal post, not shown. In forming, the metal of the jaws 12 is drawn to the extent that at least two thirds of the surface of the battery post is embraced by the jaws to insure adequate contact.

The inner and confronting surfaces of the jaws are serrated at 13, which serrations bite into the relatively soft metal of the post to reduce the likelihood of accidental displacement. Inasmuch as the jaws are curved about the post, endwise movement of the cable 10 will have no effect to loosen or displace the clamp and due to the stepped inclination of the serrations 13, upward displacement is rendered highly improbable without defacing the post, hence the clamp is positively held on the post with full assurance of adequate electrical contact.

To mount the clamp on a battery post, it is necessary only to place the clamp in position thereon and press the same downwardly to expand the jaws 12. This operation requires but a few seconds against a longer period of time necessary to mount the conventional bolt retained clamp.

To remove the clamp, a screw-driver or other tool is inserted between the jaws 12 to overcome their inherent contractive tension, springing them apart to permit the clamp to be lifted from the post without defacing or otherwise injuring the same.

It is obvious from the foregoing that corrosive substance usually accumulating around the terminal will present no interference to the removal of the clamp from the post as is usually the case when removing threaded bolts of the conventional type of cable terminal, hence much time is saved as well as preserving the equipment against damage.

Manifestly, the construction as shown and described is capable of some modification and such modification as may be construed to fall within the scope and meaning of the appended claim is also considered to be within the spirit and intent of the invention.

What is claimed is:

In a battery cable clamp, the combination comprising a sheet of spring metal shaped to form complementary and oppositely arcuated wing portions and define laterally contractible jaws adapted to clampingly receive the post of a battery, said clamp relying upon its own inherent resiliency to retain itself on said post; the confronting concave faces of said jaws being serrated to bite into said battery post to prevent upward movement of the clamp thereon, while readily permitting downward movement thereon, and a ferrule formed integral with and disposed at right angles to the longitudinal axis of said jaws and longitudinally split to receive an end of a battery cable.

FRANK AKIN.

REFERENCES CITED

The following references are of record in the file of this patent:

UNITED STATES PATENTS

| Number | Name | Date |
|---|---|---|
| 1,922,601 | Nolan | Aug. 15, 1933 |
| 1,934,559 | Raver | Nov. 7, 1933 |
| 1,965,964 | Miner | July 10, 1934 |
| 2,295,899 | Hoppenstand | Sept. 15, 1942 |

FOREIGN PATENTS

| Number | Country | Date |
|---|---|---|
| 233,556 | Germany | Apr. 12, 1911 |